(12) United States Patent
Ito et al.

(10) Patent No.: US 12,022,175 B2
(45) Date of Patent: Jun. 25, 2024

(54) VEHICLE CAMERA DEVICE

(71) Applicant: KABUSHIKI KAISHA TOKAI-RIKA-DENKI-SEISAKUSHO, Aichi-ken (JP)

(72) Inventors: Toshiya Ito, Aichi (JP); Ryusuke Sadamatsu, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 205 days.

(21) Appl. No.: 17/441,078

(22) PCT Filed: Mar. 11, 2020

(86) PCT No.: PCT/JP2020/010540
§ 371 (c)(1),
(2) Date: Sep. 20, 2021

(87) PCT Pub. No.: WO2020/195832
PCT Pub. Date: Oct. 1, 2020

(65) Prior Publication Data
US 2022/0191369 A1    Jun. 16, 2022

(30) Foreign Application Priority Data
Mar. 22, 2019  (JP) .................... 2019-055140

(51) Int. Cl.
*H04N 23/52*        (2023.01)
*B60R 1/26*         (2022.01)
(Continued)

(52) U.S. Cl.
CPC .............. *H04N 23/52* (2023.01); *B60R 1/26* (2022.01); *B60S 1/54* (2013.01); *B60S 1/56* (2013.01); *H04N 23/51* (2023.01)

(58) Field of Classification Search
CPC .......... H04N 23/52; H04N 23/51; B60S 1/54; B60S 1/56
(Continued)

(56) References Cited

U.S. PATENT DOCUMENTS

| 8,283,844 | B2 * | 10/2012 | Cho .......................... F21V 5/04 |
| | | | 313/113 |
| 2006/0119933 | A1 * | 6/2006 | Inui ....................... G11B 7/0935 |

(Continued)

FOREIGN PATENT DOCUMENTS

| JP | 2002-240628 | 8/2002 |
| JP | 2009-067341 | 4/2009 |

(Continued)

OTHER PUBLICATIONS

PCT International Search Report (w/ English translation) for corresponding PCT Application No. PCT/JP2020/010540, dated Jun. 9, 2020, 6 pages.

*Primary Examiner* — Matthew David Kim
(74) *Attorney, Agent, or Firm* — Dority & Manning, P.A.

(57) ABSTRACT

A glass cover is disposed in front of a side camera. The glass cover covers a lens while allowing light to pass through. The glass cover includes an outside-of-viewing-angle portion disposed outside an angle of view of the side camera. Moreover, a nozzle positioned outside the angle of view of the side camera is provided on the opposite side of the glass cover to the lens so as to be disposed facing the outside-of-viewing-angle portion, and is configured to jet air toward the glass cover.

8 Claims, 4 Drawing Sheets

(51) Int. Cl.
  *B60S 1/54* (2006.01)
  *B60S 1/56* (2006.01)
  *H04N 23/51* (2023.01)

(58) Field of Classification Search
  USPC .......................................................... 348/148
  See application file for complete search history.

(56) References Cited

U.S. PATENT DOCUMENTS

| | | | | |
|---|---|---|---|---|
| 2010/0253832 | A1* | 10/2010 | Duparre | H01L 27/14618 |
| | | | | 348/360 |
| 2012/0226104 | A1* | 9/2012 | Ikeda | A61B 1/127 |
| | | | | 600/129 |
| 2012/0272914 | A1* | 11/2012 | Hofman | B25J 19/023 |
| | | | | 119/14.08 |
| 2014/0027259 | A1* | 1/2014 | Kawana | G06F 3/0202 |
| | | | | 200/517 |
| 2017/0212322 | A1* | 7/2017 | Kitamura | G02B 7/02 |
| 2018/0186341 | A1 | 7/2018 | Kimura et al. | |
| 2019/0086773 | A1* | 3/2019 | Okamura | B60S 1/0848 |
| 2019/0202355 | A1* | 7/2019 | Tatara | B60S 1/56 |
| 2020/0278424 | A1* | 9/2020 | Lee | G01S 17/08 |
| 2021/0370846 | A1* | 12/2021 | Jo | B60R 11/04 |

FOREIGN PATENT DOCUMENTS

| | | |
|---|---|---|
| JP | 2009-081765 | 4/2009 |
| JP | 2009-286216 | 12/2009 |
| JP | 2018-075650 | 5/2018 |
| JP | A 2018-114974 | 7/2018 |
| WO | WO 2017/110397 | 6/2017 |
| WO | WO 2017159697 | 9/2017 |
| WO | WO 2018/135322 | 7/2018 |

* cited by examiner

VEHICLE CAMERA DEVICE

CROSS-REFERENCE TO RELATED APPLICATIONS

The present application is related and has right of priority to JP 2019-055140, which was filed on Mar. 22, 2019 in the Japanese Patent Office, and is a U.S. national phase entry of PCT/JP2020/010540, which was filed on Mar. 11, 2020, both of which are incorporated by reference in their entireties for all purposes.

TECHNICAL FIELD

The present invention relates to a vehicle camera device.

BACKGROUND ART

Rear cameras are sometimes installed at a vehicle width direction intermediate portion of a rear end side of a vehicle. An air-jetting device may be installed in order to remove foreign material such as water droplets adhering to the lens of such a rear camera (see Japanese Patent Application Laid-Open (JP-A) No. 2018-114974).

For example, JP-A No. 2018-114974 discloses a foreign object removal device that jets air from a nozzle at high pressure toward a lens that faces toward a vehicle lower rear side.

SUMMARY OF INVENTION

Technical Problem

The foreign object removal device disclosed in JP-A No. 2018-114974 is used to remove foreign material adhering to the lens of a rear camera, and is not intended to remove foreign material adhering to the lens of a side camera. Since side cameras demand a wider angle of view than rear cameras such as that discussed in JP-A No. 2018-114974, were the technology of JP-A No. 2018-114974 simply to be transferred to a side camera in order to remove foreign material from the lens, the nozzle would be disposed within range of the angle of view of the side camera. As a result, it would not be possible to secure the angle of view of the side camera were the technology of JP-A No. 2018-114974 simply to be transferred as-is.

In consideration of the above circumstances, an object of the present disclosure is to obtain a vehicle camera device capable of removing foreign material from in front of a side camera, while securing the angle of view of the side camera.

Solution to Problem

A vehicle camera device of a first aspect of the present invention includes a side camera that is provided at a vehicle side section and that is configured to image rearward from a host vehicle via a lens; a light-transmitting member that is disposed in front of the side camera so as to cover the lens, that allows light to pass therethrough, and that includes an outside-of-viewing-angle portion disposed outside an angle of view of the side camera; and a nozzle that is provided at an opposite side of the light-transmitting member to the lens at a position outside the angle of view of the side camera so as to be disposed facing the outside-of-viewing-angle portion, and that is configured to jet air toward the light-transmitting member.

According to the vehicle camera device of the first aspect of the present invention, the side camera provided at the vehicle side section is configured to image rearward from the host vehicle via the lens. The light-transmitting member is disposed in front of the side camera, and the light-transmitting member covers the lens while allowing light to pass therethrough. The side camera therefore images rearward from the host vehicle through the light-transmitting member. Note that the light-transmitting member includes the outside-of-viewing-angle portion that is disposed outside of the angle of view of the side camera. The nozzle that is also positioned outside the angle of view of the side camera is provided at the opposite side of the light-transmitting member to the lens so as to be disposed facing the outside-of-viewing-angle portion, and is configured to jet air toward the light-transmitting member. This removes any foreign material adhering to the surface of the light-transmitting member in front of the side camera, while securing the angle of view of the side camera.

A vehicle camera device of a second aspect of the present invention is the vehicle camera device of the first aspect of the present invention, further including a housing body that is configured to house the side camera and the light-transmitting member, that has a window penetrating therethrough such that the lens faces outside, and that includes a window surround configuring a surround portion of the window and formed with a notch notched from a window side, wherein a portion of the nozzle not including a leading end side is covered by part of the window surround, and a portion of the leading end side of the nozzle is disposed at the notch so as to be flush with a styling face of the window surround.

According to the vehicle camera device of the second aspect of the present invention, the side camera and the light-transmitting member are housed in the housing body, and the window through which the lens faces outside is formed penetrating the housing body. Moreover, the window surround configuring the surround portion of the window is formed with the notch that is notched from the window side. Note that the portion of the nozzle not including the leading end side is covered by part of the window surround, and the portion of the leading end side of the nozzle is disposed at the notch so as to be flush with the styling face of the window surround. This suppresses any detriment to styling qualities as a result of providing the nozzle.

A vehicle camera device of a third aspect of the present invention is the vehicle camera device of the second aspect of the present invention, wherein the window surround is configured by a tapered section formed so as to conform to the angle of view of the side camera and lie outside the angle of view of the side camera, the tapered section including a first tapered portion formed at an edge side of the window and a second tapered portion formed contiguously to the first tapered portion at an opposite side of the first tapered portion to the window and having an internal diameter with a greater rate of change than a rate of change of the first tapered portion; as viewed from a styling face side of the window surround, the notch is formed such that an edge of the notch on an opposite side to the window is contiguous to a ridge line marking a boundary between the first tapered portion and the second tapered portion; and an exposed face of the portion of the leading end side of the nozzle is exposed by the notch and is flush with a styling face of the first tapered portion so as to be disposed adjacent and contiguous to a styling face of the second tapered portion.

According to the vehicle camera device of the third aspect of the present invention, the window surround is configured by the tapered section formed so as to conform to the angle of view of the side camera and lie outside of the angle of view. This tapered section includes the first tapered portion and the second tapered portion. Moreover, the first tapered portion is formed at the edge side of the window, and the second tapered portion is formed contiguously to the first tapered portion at the opposite side to the window. The internal diameter of the second tapered portion has a greater rate of change than a rate of change of the first tapered portion. Note that as viewed from the perspective of the styling face side of the window surround, the notch is formed such that the edge on the opposite side of the notch to the window is contiguous to the ridge line marking the boundary between the first tapered portion and the second tapered portion, such that the notch is not noticeable. The exposed face of the portion of the leading end side of the nozzle exposed by the notch is flush with the styling face of the first tapered portion and is disposed adjacent and contiguous to the styling face of the second tapered portion, making the nozzle even less noticeable and thus further improving the appearance.

Advantageous Effects of Invention

As described above, the vehicle camera device of the present invention exhibits the excellent advantageous effect of enabling foreign material to be removed from in front of a side camera, while securing the angle of view of the side camera.

DESCRIPTION OF EMBODIMENTS

Figure 1:
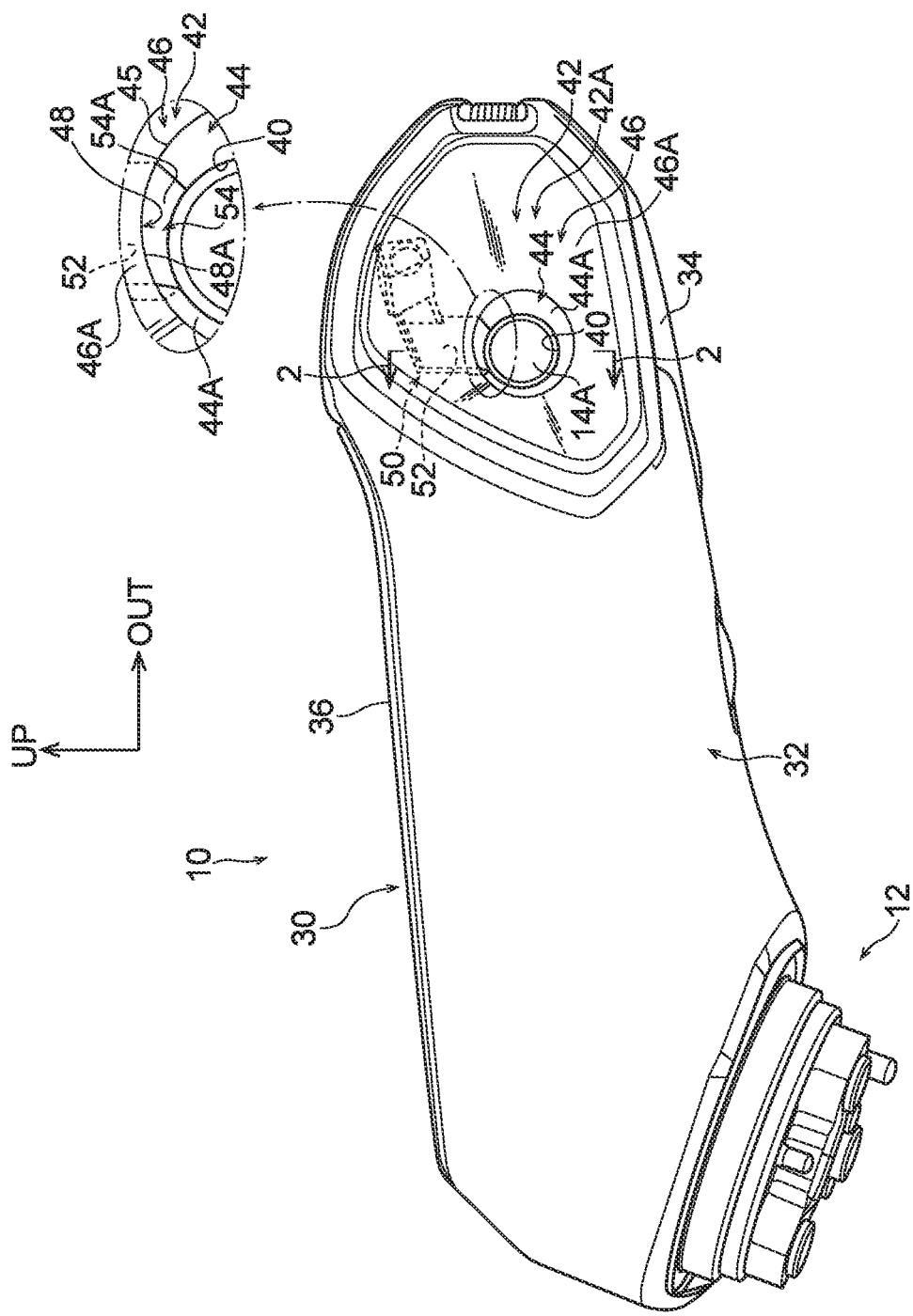
FIG. 1 is a face-on view illustrating a vehicle camera device according to an exemplary embodiment of the present invention, as viewed from a vehicle rear side.
Figure 2:
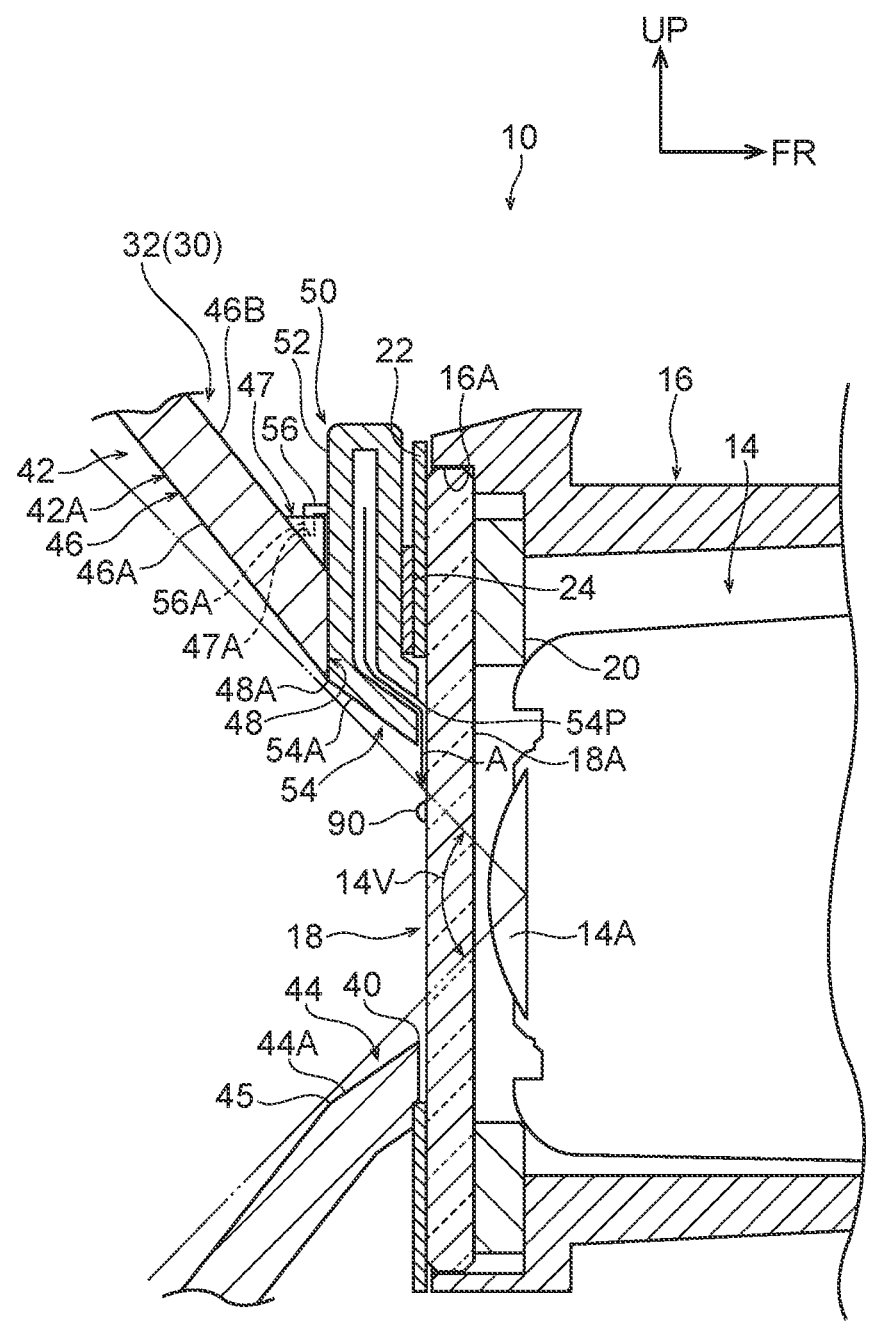
FIG. 2 is an enlarged vertical cross-section illustrating a state sectioned along line 2-2 in FIG. 1.
Figure 3:
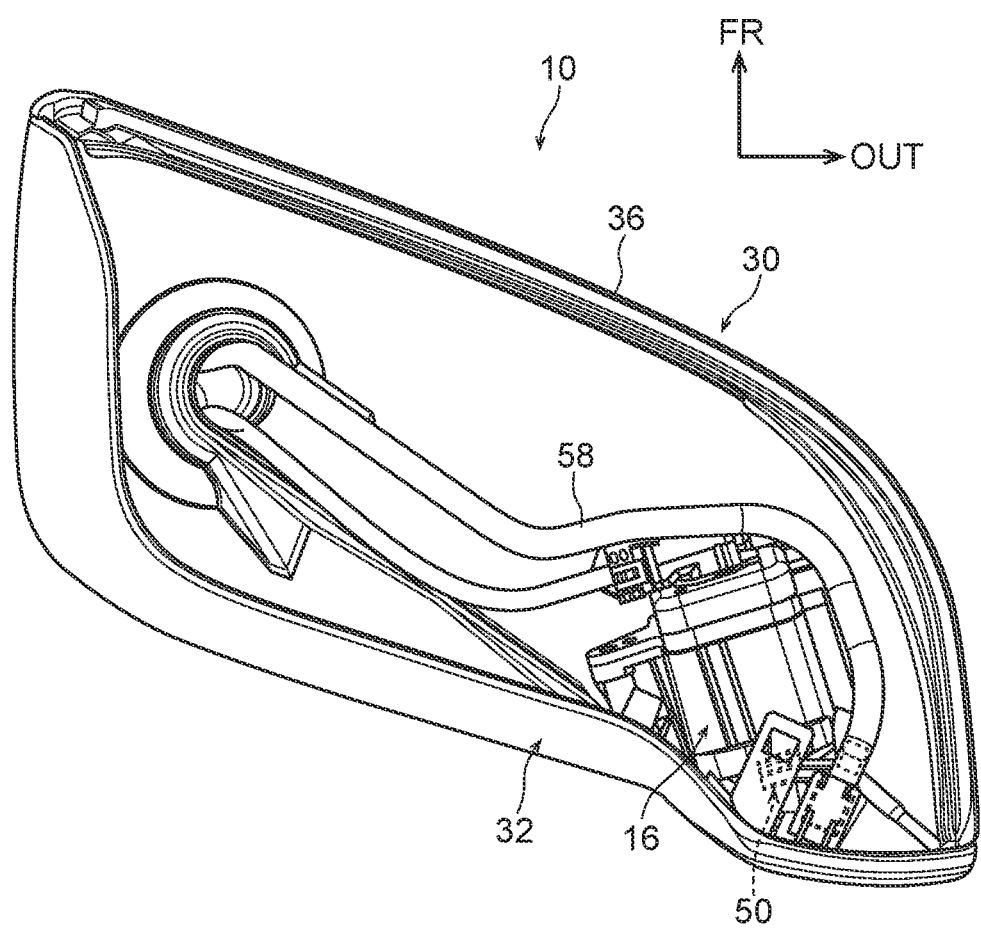
FIG. 3 is a simplified plan view illustrating a visor and part of the interior thereof as viewed from a vehicle upper side in a state in which an upper visor cover illustrated in FIG. 1 has been removed.

Explanation follows regarding a vehicle camera device according to an exemplary embodiment of the present invention, with reference to FIG. 1 to FIG. 3. Note that in the drawings, the arrow FR indicates a vehicle front side, the arrow UP indicates a vehicle upper side, and the arrow OUT indicates a vehicle width direction outside, as appropriate.

FIG. 1 is a face-on view illustrating a vehicle camera device according to the present exemplary embodiment, as viewed from a vehicle rear side. FIG. 2 is an enlarged vertical cross-section illustrating a state sectioned along line 2-2 in FIG. 1. As an example, a vehicle camera device 10 is provided on each of two side sections of a vehicle, either at vehicle front side end portions of up-down direction intermediate portions of front side doors, or vehicle rear side end portions of upper portions of fender panels.

As illustrated in FIG. 1, each of the vehicle camera devices 10 includes a support mechanism 12 that is supported on a vehicle body (not illustrated in the drawings) side, and a side camera 14, illustrated in FIG. 2, supported by the support mechanism 12. The side camera 14 is installed in order to augment visual recognition of a vehicle occupant. The side camera 14 includes a lens 14A. The lens 14A of the present exemplary embodiment is configured by a wide-angle lens directed toward the vehicle rear side. Namely, the side camera 14 images rearward from a host vehicle (over a range spanning from the side to the rear of the host vehicle) through the lens 14A. The side camera 14 is electrically connected to a control device (not illustrated in the drawings) of the vehicle, and is capable of performing imaging under the control of this control device. A monitor (not illustrated in the drawings) serving as a display mechanism is electrically connected to the control device, and the monitor is capable of displaying images captured by the side camera 14 under the control of the control device. The monitor is fitted in a vehicle cabin interior, and an occupant (specifically a driver) of the vehicle checks the images displayed on the monitor. The visual recognition of the occupant with respect to the rear side of the host vehicle is thereby augmented.

An outer peripheral side of the side camera 14 is covered by a substantially rectangular tube shaped bracket 16. The bracket 16 is enlarged at a vehicle rear side end portion. A plate shaped glass cover 18 serving as a light-transmitting member is fitted into an opening 16A in a vehicle rear side end portion of the bracket 16. The glass cover 18 is configured by a member that allows light to pass through, closes off the opening 16A at the vehicle rear side end portion of the bracket 16, and is disposed in front of the side camera 14 so as to cover the lens 14A. The glass cover 18 includes an outside-of-viewing-angle portion 18A disposed outside an angle of view 14V of the side camera 14.

One face of a double-sided tape 20 is affixed around the entire periphery of an outer peripheral portion of a vehicle front side of the glass cover 18. An outer peripheral side of the other face of the double-sided tape 20 is affixed around the entire periphery of a step face of the bracket 16. A sheet shaped heater 22 is adhered around the entire periphery of an outer peripheral portion of the vehicle rear side of the glass cover 18. Note that although not illustrated in detail in the drawings, the heater 22 is configured including a sheet, a heating element that snakes back and forth across the surface of the sheet, and connector wiring provided at end portions of the heating coil, and is configured to heat up on being supplied with electricity.

The vehicle camera device 10 further includes a resin visor 30 (see FIG. 1) serving as a housing body that houses the bracket 16, the side camera 14, and the glass cover 18. As illustrated in FIG. 1, the visor 30 configures an decorative exterior portion of the vehicle camera device 10, and is attached to part of the support mechanism 12. A vehicle rear side portion of the visor 30 is configured by a visor rim 32, a vehicle front side and lower side portion of the visor 30 is configured by a lower visor cover 34, and a vehicle front side and upper side portion of the visor 30 is configured by an upper visor cover 36.

A vehicle width direction outside portion of the visor rim 32 of the visor 30 is penetrated by a circular window 40 formed to allow the lens 14A to face externally. As illustrated in FIG. 2, an internal space of the window 40 is set so as to oppose the lens 14A through the glass cover 18. The side camera 14 is thus capable of imaging rearward from the host vehicle through the window 40.

As illustrated in FIG. 1 and FIG. 2, a window surround 42 configuring a surround of the window 40 in the visor rim 32 is configured by a tapered section that has a truncated circular conical shape formed so as to conform to the angle of view 14V of the side camera 14 (see FIG. 2 for both) and lie at the outside of the angle of view 14V. The tapered section configured by the window surround 42 includes a first tapered portion 44 formed at an edge of the window 40, and a second tapered portion 46 formed contiguously to the first tapered portion 44 on the opposite side of the first tapered portion 44 to the window 40. The internal diameter of the second tapered portion 46 has a greater rate of change than that of the first tapered portion 44.

As illustrated in FIG. 1, the window surround 42 is formed with a notch 48 (locally enlarged in FIG. 1) that is notched from the side of the window 40. As viewed from the perspective of a styling face 42A side of the window surround 42 (the viewing direction of FIG. 1), the notch 48 that is locally enlarged in FIG. 1 is formed such that an edge 48A of the notch 48 on the opposite side to the window 40 is contiguous to a ridge line 45 marking the boundary between the first tapered portion 44 and the second tapered portion 46.

As illustrated in FIG. 2, the vehicle camera device 10 includes a nozzle 50 that jets air toward the glass cover 18. The nozzle 50 is provided on the opposite side of the glass cover 18 to the lens 14A at a position outside the angle of view 14V of the side camera 14, and is disposed facing the outside-of-viewing-angle portion 18A. In the present exemplary embodiment, the nozzle 50 is disposed roughly corresponding to a vehicle width direction intermediate portion of an upper end side of the glass cover 18. The nozzle 50 includes a downward portion 52 that hangs downward toward the vehicle lower side, and a head 54 that bends so as to extend toward a vehicle lower front side from a lower end of the downward portion 52. A sealing member 24 is interposed between the downward portion 52 and the heater 22. The head 54 configures a portion of a leading end side of the nozzle 50, and a jet outlet 54P is formed at a leading end portion of the head 54. A leading end face of the head 54 is disposed facing the glass cover 18 such that a gap is formed between the leading end face of the head 54 and the glass cover 18.

FIG. 3 is a simplified plan view illustrating the visor 30 and part of the interior thereof as viewed from the vehicle upper side in a state in which the upper visor cover 36 (see FIG. 1) has been removed. As illustrated in FIG. 3, one end of a hose 58 is connected to the nozzle 50. The other end of the hose 58 is connected to a compressor (not illustrated in the drawings) via an on/off valve (not illustrated in the drawings). The compressor is configured to supply compressed air when actuated. The compressor and the on/off valve are connected to a control device (not illustrated in the drawings), and actuation of the compressor and the on/off valve is controlled by this control device.

As illustrated in FIG. 1 and FIG. 2, the downward portion 52, this configuring a portion of the nozzle 50 not including the leading end side, is covered by the second tapered portion 46 configuring part of the window surround 42. Moreover, the head 54, this configuring the portion of the leading end side of the nozzle 50 (see the locally enlarged view in FIG. 1) is disposed in the notch 48 formed in the window surround 42 so as to be flush with the styling face 42A of the window surround 42. More specifically, an exposed face 54A of the head 54 (portion of the leading end side of the nozzle 50) that is exposed by the notch 48 is flush with a styling face 44A of the first tapered portion 44 and disposed adjacent and contiguous to a styling face 46A of the second tapered portion 46.

Moreover, as illustrated in FIG. 2, protrusions 47 are formed at plural locations, for example so as to form a line in the vehicle width direction, from a non-styling face 46B at an upper portion side of the second tapered portion 46. An upper face of each of the protrusions 47 is formed with a positioning hole 47A. Corresponding to these, the downward portion 52 of the nozzle 50 is formed with plural L-shaped portions 56, each provided with a pin 56A configured to fit into the corresponding positioning hole 47A when at an assembly position. Namely, a structure in which the pins 56A fit into the respective positioning holes 47A is configured as a structure to position the nozzle 50 with respect to the window surround 42 such that the head 54 (portion of the leading end side) of the nozzle 50 is flush with the styling face 42A of the window surround 42.

Next, explanation follows regarding operation and advantageous effects of the present exemplary embodiment.

The side camera 14 images rearward from the host vehicle through the lens 14A. The glass cover 18 is disposed in front of the side camera 14, and covers the lens 14A while allowing light to pass through. The side camera 14 therefore images rearward from the host vehicle through the glass cover 18.

Note that the glass cover 18 includes the outside-of-viewing-angle portion 18A that is disposed outside of the angle of view 14V of the side camera 14. The nozzle 50 that is also positioned outside the angle of view 14V of the side camera 14 is provided on the opposite side of the glass cover 18 to the lens 14A so as to be disposed facing the outside-of-viewing-angle portion 18A, and is configured to jet air toward the glass cover 18 from an oblique upper side (see the arrow A). This removes any foreign material (for example water droplets) 90 adhering to the surface of the glass cover 18 in front of the side camera 14, while securing the angle of view 14V of the side camera 14. Moreover, since the jet outlet 54P of the nozzle 50 cannot be seen, a high quality external appearance is also achieved.

As described above, the vehicle camera device 10 of the present exemplary embodiment is capable of removing foreign material from in front of the side camera 14 while securing the angle of view 14V of the side camera 14.

Moreover, in the present exemplary embodiment the side camera 14 and the glass cover 18 are housed in the visor 30 (see FIG. 1), and the window 40 through which the lens 14A faces externally is formed penetrating the visor rim 32 of the visor 30. Note that as illustrated in FIG. 1 and FIG. 2, the downward portion 52, this configuring the portion of the nozzle 50 not including the leading end side, is covered by part of the window surround 42 (the second tapered portion 46 in the present exemplary embodiment), this being a surround portion of the window 40 in the visor rim 32. Moreover, the head 54, this configuring the portion of the leading end side of the nozzle 50, is disposed in the notch 48 notched into the window surround 42 from the window 40 side so as to be flush with the styling face 42A of the window surround 42. This suppresses any detriment to the styling qualities as a result of providing the nozzle 50. Note that styling may be said to be of greater importance in the case of the side cameras 14 than in the case of, for example, a rear camera, since the side cameras 14 are disposed in more visible locations than a rear camera.

In the present exemplary embodiment, the window surround 42 is configured by the tapered section formed so as to conform to the angle of view 14V of the side camera 14 (see FIG. 2 for both) at the outside of the angle of view 14V. This tapered section includes the first tapered portion 44 and the second tapered portion 46. Moreover, the first tapered portion 44 is formed at the edge of the window 40, and the second tapered portion 46 is formed contiguously to the first tapered portion 44 on the opposite side of the first tapered portion 44 to the window 40, and the internal diameter of the second tapered portion 46 has a greater rate of change than that of the first tapered portion 44. Note that as viewed from the perspective of the styling face 42A side of the window surround 42, the notch 48 is formed such that the edge 48A on the opposite side to the window 40 is contiguous to the ridge line 45 marking the boundary between the first tapered portion 44 and the second tapered portion 46, such that the notch 48 is not noticeable. The exposed face 54A of the head 54 configuring the portion of the leading end side of the nozzle 50 and exposed by the notch 48 is flush with the styling face 44A of the first tapered portion 44 and is disposed adjacent and contiguous to the styling face 46A of the second tapered portion 46, making the nozzle 50 even less noticeable and thus further improving the appearance.

Next, explanation follows regarding modified examples of the exemplary embodiment described above, with reference to FIG. 4A and FIG. 4B, FIG. 4A is a vertical cross-section illustrating part of a first modified example (at a location corresponding to the upper side of FIG. 2), and FIG. 4B is a vertical cross-section illustrating part of a second modified example (at a location corresponding to the upper side of FIG. 2). Note that these modified examples have effectively the same configuration as the exemplary embodiment described above, with the exception of the points mentioned below. Accordingly, configuration elements that are effectively the same as those of the exemplary embodiment described above are allocated the same reference numerals, and explanation thereof is omitted.

Figure 4A:
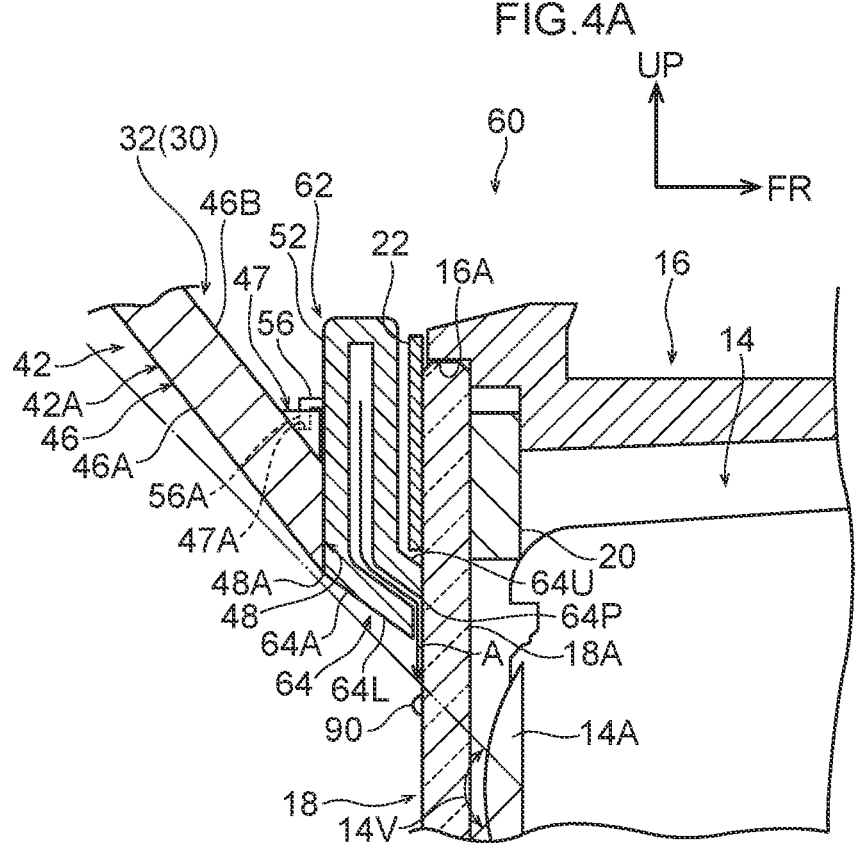
FIG. 4A is a vertical cross-section illustrating a first modified example.

As illustrated in FIG. 4A, a vehicle camera device 60 according to the first modified example includes a head 64 that differs from the head 54 (see FIG. 2) of the exemplary embodiment described above as a portion of a leading end side of a nozzle 62. Other configurations of the nozzle 62 are similar to those of the nozzle 50 of the exemplary embodiment described above (see FIG. 2). The head 64 is bent from a lower end of the downward portion 52 so as to extend toward the vehicle lower front side. An exposed face 64A of the head 64 that is exposed by the notch 48 is set at the same position as the exposed face 54A of the head 54 in the exemplary embodiment described above (see FIG. 2 for both). The head 64 is configured including an upper side inclined wall 64U and a lower side inclined wall 64L and a jet outlet 64P is formed at a leading end portion of the head 64. A leading end side face of the upper side inclined wall 64U contacts the glass cover 18, and a leading end side face of the lower side inclined wall 64L is disposed at a slight separation from the glass cover 18. There is no member corresponding to the sealing member 24 (see FIG. 2) of the exemplary embodiment described above disposed between the downward portion 52 and the heater 22.

Similarly to the exemplary embodiment described above, the vehicle camera device 60 according to the first modified example is capable of removing foreign material from in front of the side camera 14 while securing the angle of view 14V of the side camera 14. Moreover, in the vehicle camera device 60 according to the first modified example, a phenomenon in which a portion of the air jetted from the nozzle 62 escapes toward the upper side after colliding with the glass cover 18 can be suppressed by the upper side inclined wall 64U. A member corresponding to the sealing member 24 (see FIG. 2) of the exemplary embodiment described above therefore no longer serves any purpose.

Figure 4B:
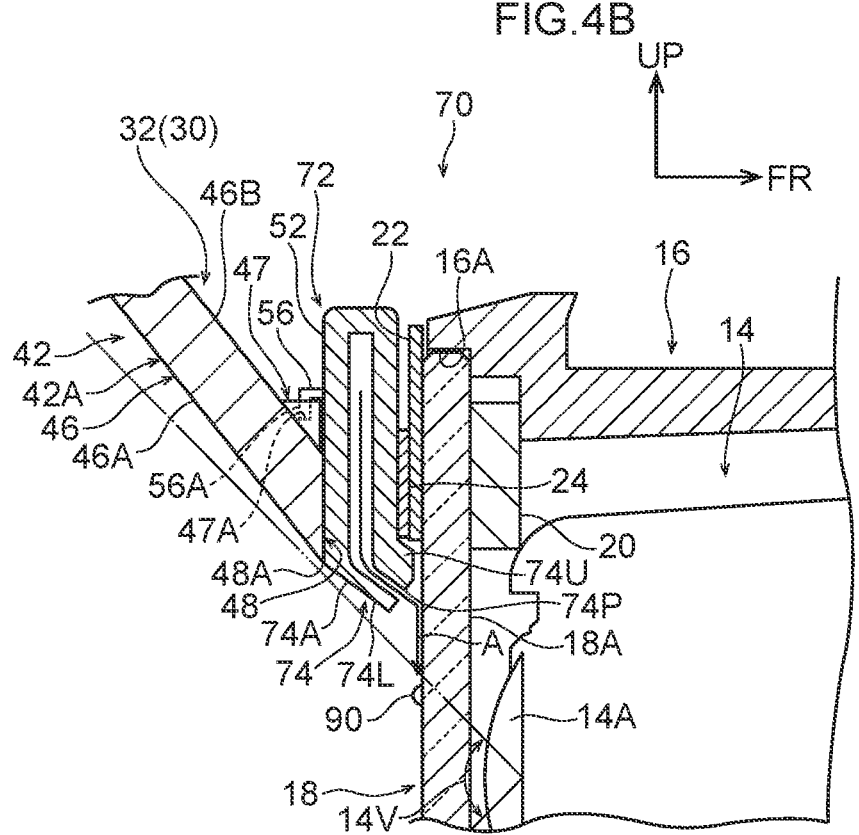
FIG. 4B is a vertical cross-section illustrating a second modified example.

As illustrated in FIG. 4B, a vehicle camera device 70 according to the second modified example includes a head 74 that differs from the head 54 (see FIG. 2) of the exemplary embodiment described above as a portion of a leading end side of a nozzle 72. Other configurations of the nozzle 72 are similar to those of the nozzle 50 of the exemplary embodiment described above (see FIG. 2). The head 74 is bent from a lower end of the downward portion 52 so as to extend toward the vehicle lower front side. The head 74 is configured including an upper side inclined wall 74U and a lower inclined wall 74L. The upper side inclined wall 74U is set with a greater thickness than other locations of the nozzle 72 while the lower inclined wall 74L is set with a thinner thickness than other locations of the nozzle 72. Moreover, a leading end side of the head 74 has a shape that is notched in a direction orthogonal to the incline direction of the head 74 in the side view cross-section illustrated in FIG. 4B, and a jet outlet 74P is formed in a leading end portion of the head 74. The leading end portion of the head 74 is disposed at a separation from the glass cover 18. An exposed face 74A of the head 74 that is exposed by the notch 48 is set at the same position as a location of the exception of a leading end side of the exposed face 54A of the head 54 of the exemplary embodiment described above (see FIG. 2 for both).

The vehicle camera device 70 according to the second modified example is also capable of removing foreign material from in front of the side camera 14 while securing the angle of view 14V of the side camera 14.

Note that in the exemplary embodiment and the first and second modified examples described above, the glass cover 18 is provided as a light-transmitting member. However, a transparent resin cover may be applied as this light-transmitting member.

Moreover, in the exemplary embodiment and the first and second modified examples described above the downward portion 52 configuring the portion of the nozzle 50, 62, 72 not including the leading end side is covered by part (namely the second tapered portion 46) of the window surround 42 of the visor 30 as illustrated in FIG. 1, FIG. 2, FIG. 4A, and FIG. 4B. However, a configuration may be adopted in which the entire nozzle is not covered by part of the visor acting as a housing body.

Moreover, in the exemplary embodiment described above, the window surround 42 of the visor 30 includes the first tapered portion 44 and the second tapered portion 46 configuring the tapered section. However, a window surround of the visor that acts as a housing body may be configured by a tapered section formed so as to conform to the angle of view of the side camera such that the internal diameter of the window surround has a uniform rate of change, or may be configured by a window surround with another shape, for example a flat plate shaped window surround.

Note that the exemplary embodiment and modified examples described above may also be combined as appropriate.

Although explanation has been given regarding an example of the present invention, the present invention is not limited by the above description, and obviously various modifications may be implemented within a range not departing from the spirit of the present invention.

The disclosure of Japanese Patent Application No. 2019-055140, filed on Mar. 22, 2019, is incorporated in its entirety by reference herein.

The invention claimed is:
1. A vehicle camera device comprising:
   a side camera that is provided at a vehicle side section and that is configured to image rearward from a host vehicle via a lens;

a light-transmitting member that is disposed in front of the side camera so as to cover the lens, that allows light to pass therethrough, and that includes an outside-of-viewing-angle portion disposed outside an angle of view of the side camera; and a nozzle that is provided at an opposite side of the light-transmitting member to the lens at a position outside the angle of view of the side camera so as to be disposed facing an opposite range of the outside-of-viewing-angle portion from the side camera, and that is configured to jet air toward the light-transmitting member; and a housing body that is configured to house the side camera and the light-transmitting member, that has a window penetrating therethrough such that the lens faces outside, and that includes a window surround configuring a surround portion of the window and formed with a notch notched from a window side, wherein the nozzle is disposed at the notch.

2. The vehicle camera device of claim 1,
wherein:
a portion of the nozzle not including a leading end side is covered by part of the window surround, and a portion of the leading end side of the nozzle is disposed at the notch so as to be flush with a styling face of the window surround.

3. The vehicle camera device of claim 2, wherein:
the window surround is configured by a tapered section formed so as to conform to the angle of view of the side camera and lie outside the angle of view of the side camera, the tapered section including a first tapered portion formed at an edge side of the window and a second tapered portion formed contiguously to the first tapered portion at an opposite side of the first tapered portion to the window and having an internal diameter with a greater rate of change than a rate of change of the first tapered portion;

as viewed from a styling face side of the window surround, the notch is formed such that an edge of the notch on an opposite side to the window is contiguous to a ridge line marking a boundary between the first tapered portion and the second tapered portion; and an exposed face of the portion of the leading end side of the nozzle is exposed by the notch and is flush with a styling face of the first tapered portion so as to be disposed adjacent and contiguous to a styling face of the second tapered portion.

4. A vehicle camera device comprising:
a side camera that is provided at a vehicle side section and that is configured to image rearward from a host vehicle via a lens;

a light-transmitting member that is disposed in front of the side camera so as to cover the lens, that allows light to pass therethrough, and that includes an outside-of-viewing-angle portion disposed outside an angle of view of the side camera; and a nozzle that is provided at an opposite side of the light-transmitting member to the lens at a position outside the angle of view of the side camera so as to be disposed facing the outside-of-viewing-angle portion, and that is configured to jet air from a jet outlet toward the light-transmitting member, the jet outlet facing the light-transmitting member; and a housing body that is configured to house the side camera and the light-transmitting member, that has a window penetrating therethrough such that the lens faces outside, and that includes a window surround configuring a surround portion of the window and formed with a notch notched from a window side, wherein the nozzle is disposed at the notch.

5. The vehicle camera device of claim 4,
wherein:
a portion of the nozzle not including a leading end side is covered by part of the window surround, and a portion of the leading end side of the nozzle is disposed at the notch so as to be flush with a styling face of the window surround.

6. The vehicle camera device of claim 4,
wherein:
a portion of the nozzle not including a leading end side is covered by part of the window surround, and a portion of the leading end side of the nozzle is disposed at the notch so as to be flush with a styling face of the window surround;

the window surround is configured by a tapered section formed so as to conform to the angle of view of the side camera and lie outside the angle of view of the side camera, the tapered section including a first tapered portion formed at an edge side of the window and a second tapered portion formed contiguously to the first tapered portion at an opposite side of the first tapered portion to the window and having an internal diameter with a greater rate of change than a rate of change of the first tapered portion;

as viewed from a styling face side of the window surround, the notch is formed such that an edge of the notch on an opposite side to the window is contiguous to a ridge line marking a boundary between the first tapered portion and the second tapered portion; and an exposed face of the portion of the leading end side of the nozzle is exposed by the notch and is flush with a styling face of the first tapered portion so as to be disposed adjacent and contiguous to a styling face of the second tapered portion.

7. A vehicle camera device comprising:
a side camera that is provided at a vehicle side section and that is configured to image rearward from a host vehicle via a lens;

a light-transmitting member that is disposed in front of the side camera so as to cover the lens, that allows light to pass therethrough, and that includes an outside-of-viewing-angle portion disposed outside an angle of view of the side camera;

a nozzle that is provided at an opposite side of the light-transmitting member to the lens at a position outside the angle of view of the side camera so as to be disposed facing the outside-of-viewing-angle portion, and that is configured to jet air toward the light-transmitting member;

a housing body that is configured to house the side camera and the light-transmitting member, that has a window penetrating therethrough such that the lens faces outside, and that includes a window surround configuring a surround portion of the window, is separated from the nozzle, and is formed with a notch notched from a window side, wherein:

a portion of the nozzle not including a leading end side is covered by part of the window surround, and a portion of the leading end side of the nozzle is disposed at the notch so as to be flush with a styling face of the window surround.

8. The vehicle camera device of claim 7, wherein:
the window surround is configured by a tapered section formed so as to conform to the angle of view of the side camera and lie outside the angle of view of the side camera, the tapered section including a first tapered portion formed at an edge side of the window and a second tapered portion formed contiguously to the first tapered portion at an opposite side of the first tapered portion to the window and having an internal diameter with a greater rate of change than a rate of change of the first tapered portion;

as viewed from a styling face side of the window surround, the notch is formed such that an edge of the notch on an opposite side to the window is contiguous to a ridge line marking a boundary between the first tapered portion and the second tapered portion; and an exposed face of the portion of the leading end side of the nozzle is exposed by the notch and is flush with a styling face of the first tapered portion so as to be disposed adjacent and contiguous to a styling face of the second tapered portion.

\* \* \* \* \*